(12) United States Patent
Sng et al.

(10) Patent No.: US 9,894,177 B2
(45) Date of Patent: Feb. 13, 2018

(54) SYSTEM AND METHOD FOR DEVICE MANAGEMENT USING A SOCIAL NETWORK

(71) Applicant: Sharp Laboratories of America, Inc., Camas, WA (US)

(72) Inventors: Swee Huat Sng, Torrance, CA (US); Lena Sojian, Fountain Valley, CA (US); Roger Shih, Irvine, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 334 days.

(21) Appl. No.: 14/231,444

(22) Filed: Mar. 31, 2014

(65) Prior Publication Data

US 2015/0281393 A1    Oct. 1, 2015

(51) Int. Cl.
*G06F 15/16*    (2006.01)
*H04L 29/08*    (2006.01)

(52) U.S. Cl.
CPC ............ *H04L 67/306* (2013.01); *H04L 67/22* (2013.01)

(58) Field of Classification Search
CPC .. G06F 17/30867; H04L 67/22; H04L 67/306
See application file for complete search history.

(56) References Cited

U.S. PATENT DOCUMENTS

| | | | | |
|---|---|---|---|---|
| 2003/0195811 A1* | 10/2003 | Hayes, Jr. | ............... | G06Q 10/10 705/26.41 |
| 2008/0117201 A1* | 5/2008 | Martinez | ........... | G06F 17/30035 345/418 |
| 2008/0288484 A1* | 11/2008 | Bouzid | .................. | H04L 67/303 |
| 2009/0323106 A1* | 12/2009 | Suga | ...................... | G06F 3/1204 358/1.15 |
| 2010/0005520 A1* | 1/2010 | Abbot | ................ | G06Q 30/0255 726/6 |
| 2010/0107225 A1* | 4/2010 | Spencer | .............. | H04L 63/0876 726/4 |
| 2010/0293105 A1 | 11/2010 | Blinn et al. | | |

(Continued)

FOREIGN PATENT DOCUMENTS

GB    2478767    9/2011

*Primary Examiner* — Anthony Mejia
*Assistant Examiner* — Dixon Dabipi
(74) *Attorney, Agent, or Firm* — Law Office of Gerald Maliszewski; Gerald Maliszewski

(57) ABSTRACT

A method is provided for managing a social network of devices. The method provides a non-transitory memory, a network interface, and a social network application. Network-connected local devices create user accounts in the social network and populate a user profile listing device characteristics. Some examples of device characteristics include model and serial number. A central server is then able to access the user profiles in the social network, and cross-reference user profiles to a first device characteristic. The central server sends queries via the social network to selected local devices matching the first device characteristic and receives responses to the queries via the social network from the selected local devices. Further, the central server may maintain a database, stored in a central non-transitory memory, of queries and responses cross-referenced to the local devices. A system is also provided for managing devices using a social networking application.

2 Claims, 3 Drawing Sheets

(56) References Cited

U.S. PATENT DOCUMENTS

| | | | | |
|---|---|---|---|---|
| 2011/0026704 A1* | 2/2011 | Connelly | H04L 63/102 | 379/219 |
| 2011/0313926 A1* | 12/2011 | Templeton | G06Q 20/10 | 705/44 |
| 2012/0040615 A1* | 2/2012 | Auriffeille | G06Q 10/10 | 455/41.2 |
| 2012/0079126 A1* | 3/2012 | Evans | G06F 9/4443 | 709/230 |
| 2013/0097269 A1* | 4/2013 | Plotkin | H04L 51/02 | 709/206 |
| 2013/0304727 A1* | 11/2013 | Poon | G06F 17/30477 | 707/722 |
| 2014/0113646 A1* | 4/2014 | Maggenti | H04L 67/306 | 455/452.1 |
| 2014/0164519 A1* | 6/2014 | Shah | H04L 67/306 | 709/204 |
| 2014/0236598 A1* | 8/2014 | Fructuoso | G10L 13/04 | 704/249 |
| 2016/0342694 A1* | 11/2016 | Allen | H04L 67/10 | |

* cited by examiner

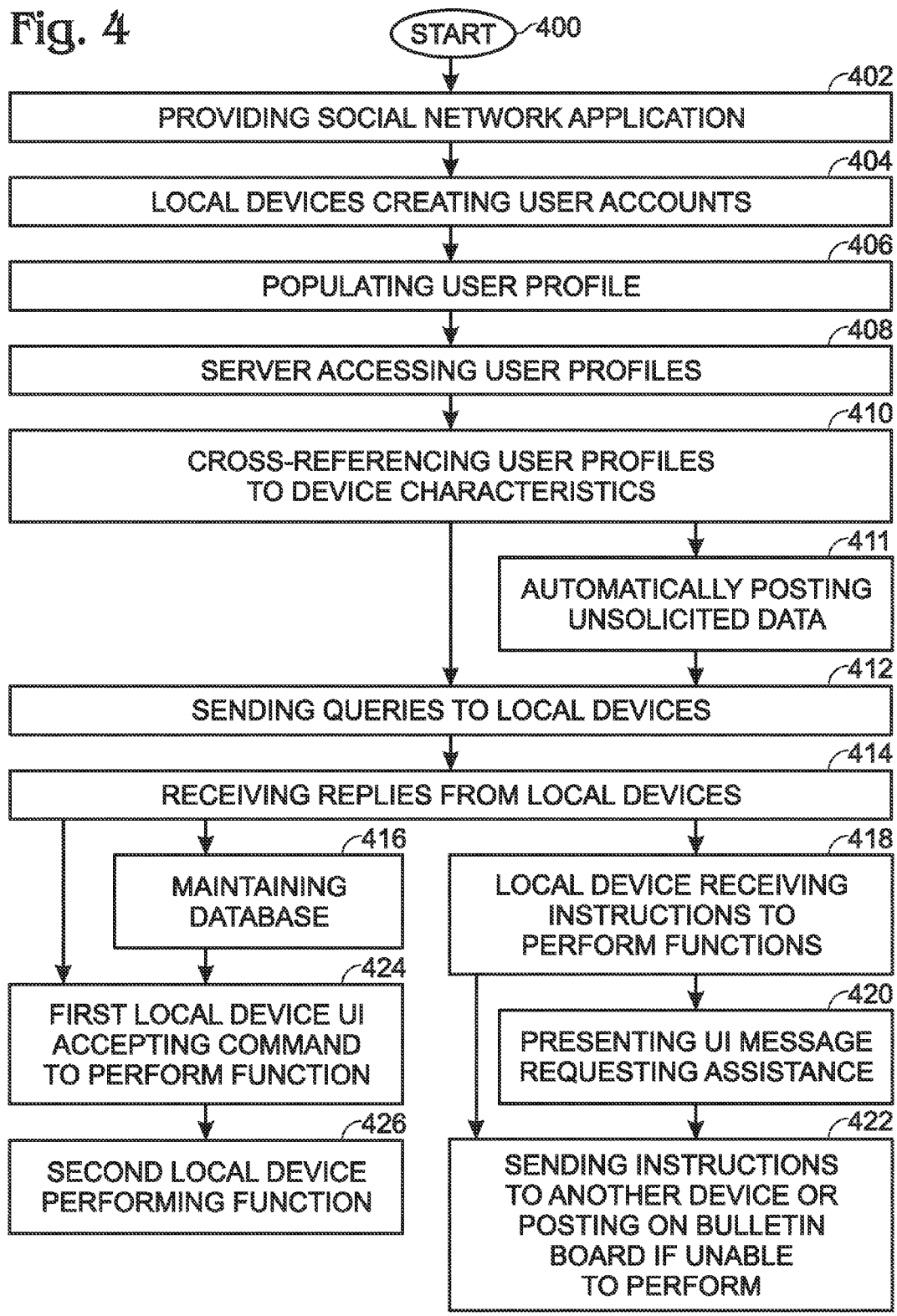

SYSTEM AND METHOD FOR DEVICE MANAGEMENT USING A SOCIAL NETWORK

BACKGROUND OF THE INVENTION

1. Field of the Invention

This invention generally relates to communications networks and, more particularly, to a system and method for controlling a system of devices using a social network application.

2. Description of the Related Art

A social network is a public network that allows a group of registered members to socialize by sharing ideas, conversations, and digital resources such as web links, photos, videos, and documents. The social network can either be organized around a particular special interest (niche network) or open to all (general network). The popularity and success of Facebook™, which is a general social network, has spawned a large number of niche social networks in the Internet.

Social networking applications can be web-based applications that can allow users to create and publish shared content on their personal web pages. Shared content can include all types of digital media accessible by visitors to the personal web page, including text, web links, photographs, video content, and audio content. Using the social networking application, access to the shared content can be restricted to a subset of the users that can access the personal web page, which can itself be a subset of the users of the social networking application. Permission to access the shared content can be set by the owner of the personal web page, for example.

The major advantages of social networks over conventional discussion forums or message bulletin boards are that:

Interactions between members are near-realtime;
Groups consisting of selected members can be created, with group access limited only to group members;
Posts or messages can be targeted to individual members, groups, threads, or broadcasted to all (depending on access restrictions setting);
Expanding an individual's connections through discovering mutual friends is much easier;
Having a central communications hub through which all member interactions occur provides a rich source of analytics and behavioral data from which to mine;
Surveys or polls of network members can be conducted very easily;

A smart device is defined as a device with sufficient processing capacity and embedded firmware that allows it to perform certain functions semi-autonomously. Depending on the level of sophistication, a smart device is capable of making decisions to carry out its intended function effectively. Examples of smart devices include smart mobile phones, MFPs (Multi-Function Peripherals), network routers, smart TVs, etc.

A device management system is a system that allows administrators to manage and monitor networks of smart devices. An internal deployment model consists of a server located within a corporate firewall to manage smart devices (e.g. network routers and MFPs) that are within the corporate network. An external deployment model consists of a public server accessible through the Internet to manage smart devices that are within individual corporate networks. There are pros and cons associated with each deployment model, with security, performance, centrality of data, ease of use, and network protocol support being the main concerns for deciding which model to use. Regardless of the deployment model, a typical system should allow administrators to view the latest status of monitored devices, query for the most recent status from individual devices or group of devices, and control or configure certain settings of devices. More advanced systems allow software to deliver updates to devices, view the current display screen of devices, or remotely control certain functions of devices.

Creating a device management system is a non-trivial undertaking. The system is limited by the standard or proprietary network protocols that the managed devices support. An example of a standard device management network protocol is the Simple Network Management Protocol (SNMP) which is an Internet-standard protocol for managing devices on IP networks. SNMP is a component of the Internet Protocol Suite as defined by the Internet Engineering Task Force (IETF). It consists of a set of standards for network management, including an application layer protocol, a database schema, and a set of data objects. SNMP exposes management data in the form of variables on the managed systems, which describe the system configuration. These variables can then be queried (and sometimes set) by managing applications.

In typical SNMP uses, one or more administrative computers, called managers, have the task of monitoring or managing a group of hosts or devices on a computer network. Each managed system executes, at all times, a software component called an agent which reports information via SNMP to the manager. Essentially, SNMP agents expose management data on the managed systems as variables. The protocol also permits active management tasks, such as modifying and applying a new configuration through remote modification of these variables. The variables accessible via SNMP are organized in hierarchies. These hierarchies, and other metadata (such as type and description of the variable), are described by Management Information Bases (MIBs).

Examples of proprietary device management network protocols are: Sharp open systems architecture (OSA) and Canon CPCA. A device management system typically consists of a server platform that communicates with managed devices through the mentioned standard or proprietary network protocols. The server has to maintain a database of devices. The device database typically contains status information of each device, as well as commands to be sent to each device. The server also has to maintain a security policy, utilizing user authentication to ensure that non-authorized personnel are not allowed access to the managed devices.

Most device management systems in use today utilize an internal deployment model. Canon's iWEMC (imageWare Enterprise Management Console), Sharp's PAU (Printer Administration Utility), HP Web Jetadmin, and Xerox CentreWare Web are good examples. There is no convenient solution available for a central authority (e.g. the device manufacturer, dealers, or vendors) to manage and monitor a fleet of devices across different company networks. In one such system a central server collects device status and events from all MFPs that have been configured properly. The server is also capable of pushing out firmware updates and control commands to the MFP devices. The disadvantages of existing device management solutions are that (1) they only work properly with a specific brand of devices, (2) most device management systems utilize internal deployment model so it is hard for one central administrator to manage devices for many different clients, (3) each company has to set up its own dedicated management server and administrator, and (4) data collection for analytics is only possible if the device management system has this feature built-in.

It would be advantageous if a network of smart devices could be controlled based upon modifications to pre-existing, easy to use social networking applications.

SUMMARY OF THE INVENTION

Disclosed herein are a system and method for utilizing a social network to control and manage smart devices. A social network platform has many inherent properties that make it ideally suited for managing and monitoring smart devices. A social network server maintains a database of users, similar to a device management server maintaining a database of devices. A social network consists of users interacting with each other in near-realtime, similar to device management administrators querying data and collecting realtime events from managed devices. Social networking groups consolidate related users in manageable collections, making groups ideally suited to categorizing devices based on type (e.g. all printers, all TVs), corporate entity (e.g. all multifunctional peripherals (MFPs) in company A, all devices in New York office of company X), responsibility (e.g. all devices managed by David, all devices managed by John), or any custom grouping. Messages sent between users in a social network are similar to commands and responses sent between administrators and devices, or between devices and other devices. Self-registration of users in a social network can be applied to devices as well, allowing new devices to automatically register themselves within the device social network. Advertisements delivered to user newsfeeds can be applied to device systems as well, allowing dealers, or vendors to deliver targeted advertising to selected smart devices, e.g. delivering toner ads to MFPs, new drug ads to IDPs (Information Display Panels) in doctor's offices. Tracking usage through data analytics can also be applied to device management, allowing a printer vendor to track a usage pattern of MFPs.

Facebook™ is one of the most well-known brands in the Internet today. It is one of the most-visited websites on mobile platforms. Most adults have user accounts in at least one major social network, have read and posted messages on such a social network, and are familiar with social networking terminologies like wall, post, feed, group, poke, etc. This means that a device social networking platform is instinctively easier to use. With the advent of Apple's Siri®, most adults are also becoming familiar with communicating with smart devices as if they are human beings with personalities. Creating a social network where the users are smart devices fits in with this trend. Administrators no longer have to remember arcane commands or invoke a series of custom user interface steps to perform device functions. They are able to post messages to smart devices using natural language sentence structure and receive valid responses. Similarly, devices may be able to post a command to the wall of other devices within their device groupings. The smart devices may be imbued with natural language-processing abilities to process key elements of a sentence and carry out the necessary tasks. The instructions can be directed at a single device to be performed independently (e.g. instructing an MFP to scan a page), or at several devices to be performed collaboratively (e.g. instructing an Information Display Panel (IDP) to send its display screen to a printer to be printed out). For developers, the task of creating a device management system is also much easier; they can utilize an off-the-shelf social networking platform like SocialEngine, elgg, Anahita or BuddyPress (a WordPress plugin) to jump-start their development. Important features of a social networking platform are already provided in the above-mentioned projects; the developer just has to focus on value-added features, customizing for specific use cases and ensuring robust device compatibility.

Accordingly, a method is provided for managing a social network of devices. The method provides a non-transitory memory, a network interface, and a social network application. Local devices, network-connected with the memory, create user accounts in the social network and populate a user profile listing device characteristics. Some examples of device characteristics include model, serial number, manufacturer, user-created name, location, owner, group memberships, status, functions, network address, and an inventory of consumable resources. A central server is then able to access the user profiles in the social network, and cross-reference user profiles to a first device characteristic. The central server sends queries via the social network to selected local devices matching the first device characteristic and receives responses to the queries via the social network from the selected local devices. Further, the central server may maintain a database, stored in a central non-transitory memory, of queries and responses cross-referenced to the local devices.

In one aspect, the social network provides a bulletin board, and the local devices are able to automatically send unsolicited data via the social network for posting on the social network bulletin board. Then, the central server may access the social network bulletin board and add the unsolicited data to the database. In another aspect, a first local device having a user account may receive instructions via the social network, for functions to be performed. As part of the performance of the function, the first local device user interface (UI) may present a message in a natural human language, requesting user assistance in performing the functions. If the first local device is unable to perform functions sent in the instructions, it may send the instructions via the social network, for a second local device having a user account in the social network, to perform the functions or, alternatively, post the instruction on a social network bulletin board. In another aspect, the UI associated with the first local device may accept a command from a user, formatted in a natural human language, for functions to be performed. A second local device having a user account may perform the functions in response to the first local device posting the task on the social network bulletin board, and the second local device accessing the social network bulletin board. As an alternative, the first local device may access the social network database, determine that the second local device is capable of performing the functions, and send instructions via the social network to second local device for the functions to be performed. As another alternative, the first local device may post the instructions on the bulletin board, and then the central server accesses the posted instructions and database, determines that the second local device is capable of performing the functions, and sends the instructions via the social network to second local device.

Additional details of the above-described method and a social network device management system are provided below.

BRIEF DESCRIPTION OF THE DRAWINGS

FIG. 4 is a flowchart illustrating a method for managing a social network of devices.

DETAILED DESCRIPTION

Figure 1:
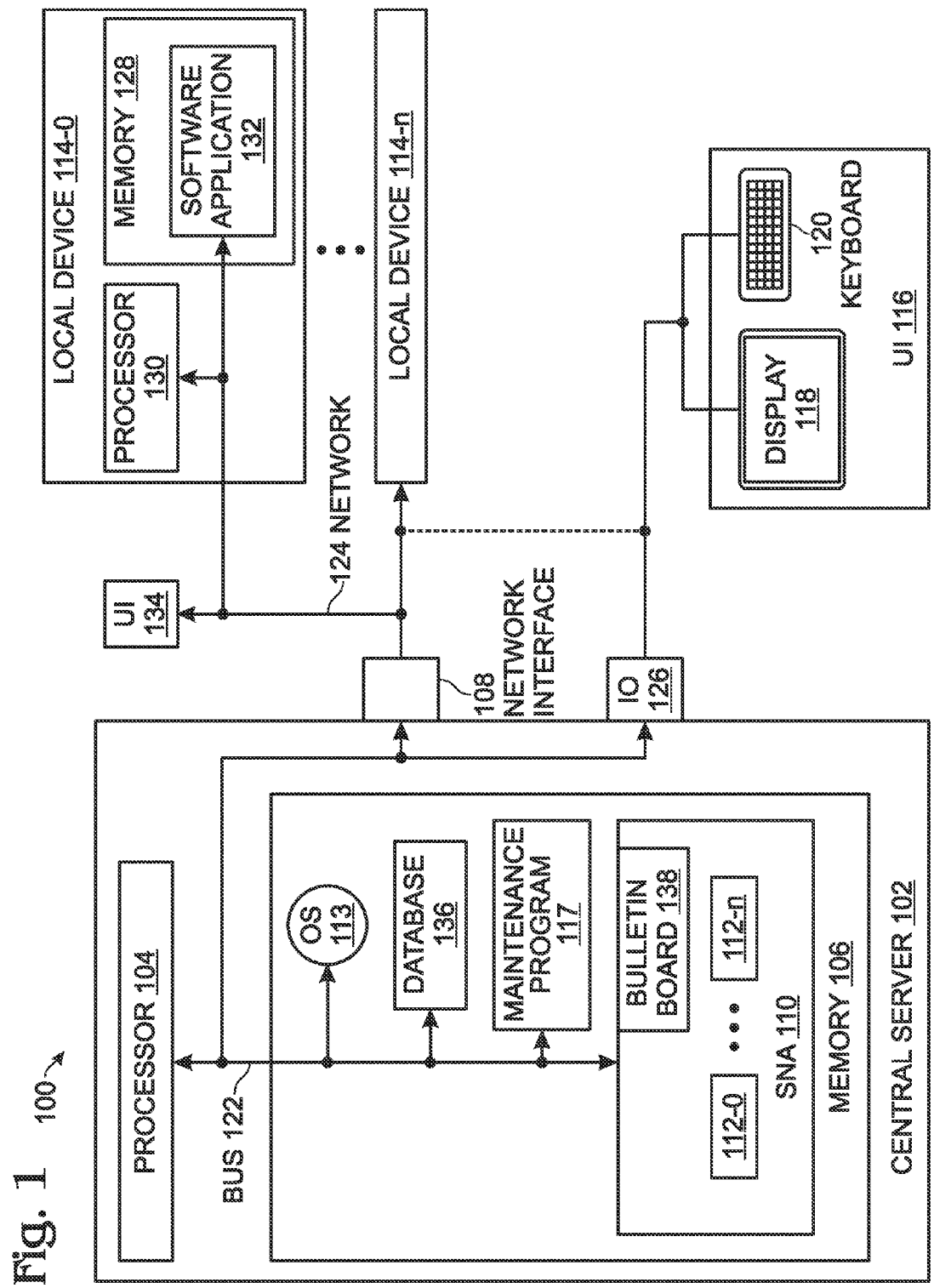
FIG. 1 is a schematic block diagram of a social network device management system.

FIG. 1 is a schematic block diagram of a social network device management system. The system 100 comprises a central server 102, which in turn comprises a processor 104, a non-transitory memory 106, and a network interface 108. A social network application (SNA) 110 is enabled as a software application with a sequence of processor instructions stored in the memory 106 with a plurality of user accounts 112-0 through 112-n, where n is an integer greater than or equal to 0. Each user account 112-0 through 112-n is respectively associated with a local device 114-0 through 114-n.

Figure 2:
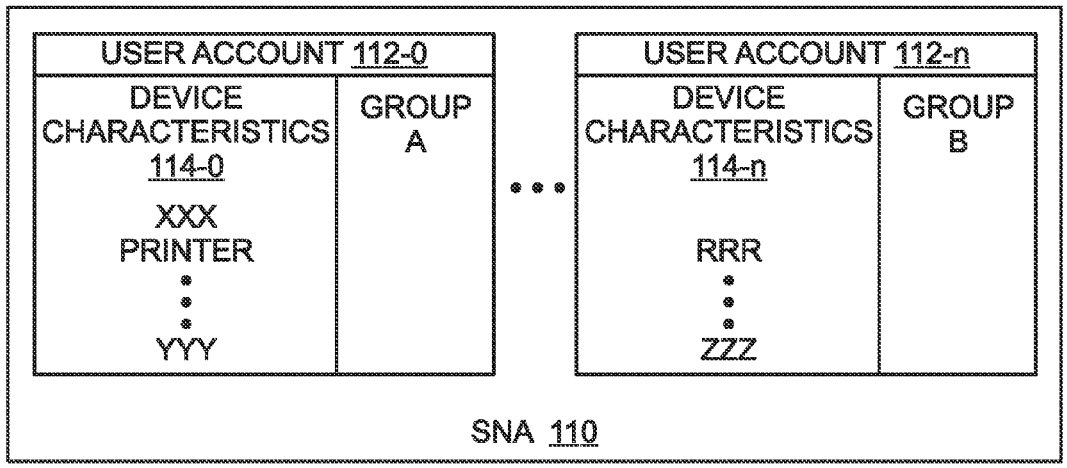
FIG. 2 is a block diagram representing social network user accounts.

FIG. 2 is a block diagram representing social network user accounts. User accounts 112-0 through 112-n are associated respectively with local devices 114-0 through 114-n. Each user account includes a user profile listing device characteristics. Some examples of device characteristics include model, serial number, manufacturer, user-created name, location, owner, group memberships, status, functions, network address, and an inventory of consumable resources, to name a few examples. In one aspect, the social network application 110 differentiates local device characteristics in the user profiles into a plurality of device groups based upon device characteristics, which permits the central server to cross-reference device characteristics to a first device group. For example, the central server may discover local device 114-0 in Group A, because all the devices in Group A support a desired printing function.

Returning to FIG. 1, the central server 102 may access the user profiles 112-0 through 112-n in the social network 110. For example, the central server may act as a result of a user interface (UI) 116 associated with the central server 102 receiving a command from a user. Here the UI 116 is represented with a display 118 and a keyboard 120. However, other mechanisms (not shown) such as a cursor control device, mouse, touchpad, touchscreen, trackball, stylus, cursor direction keys, voice recognition, and motion recognition, to name a few example, can also be used to enable the UI. As an alternative to taking direction via the UI 116, the central server 102 may act as a result of an automated, or semi-automated maintenance program 117 in memory 106, enabled as a sequence of instructions executed by processor 104.

The central server is a computer system with a bus 122 or other communication mechanism for communicating information, and memory 106 may be a memory, such as a random access memory (RAM) or other dynamic storage device, coupled to the bus 122 for storing information and instructions to be executed by processor. Some examples of suitable communication bus protocols include an Industry Standard Architecture (ISA), a Peripheral Component Interconnect (PCI), a PCI Express (PCIe), and/or any other suitable bus).

These memories may also be referred to as a computer-readable medium. The execution of the sequences of instructions contained in a computer-readable medium may cause a processor to perform some of the steps associated with managing a social network of connected devices. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, an electromagnetic or optical carrier wave, or any other medium from which a computer can read.

The above described components are shown as embedded with the central server 102, but with the exception of RAM/storage, they may alternatively be distributed with devices that are connected with the central server by way the Internet, intranet, local area network (LAN), or wide area network (WAN). The central server and connected devices may be work stations, personal computers, MAC computers, tablets, notebook computers, handheld devices such as cell phones, smart phones, or personal digital assistants (PDAs) to name a few examples.

The central server network interface 108 may be more than one interface, shown by way of example as an interface for data communications via a network 124. The interface 108 may be a modem, an Ethernet card, or any other appropriate data communications device such as USB. Other possible protocols include IEEE 1394 protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

The physical communication links may be optical, wired, or wireless. The UI 116 is connected to the bus 122 via an input/output (IO) interface that may be USB, digital visual interface (DVI), or high definition multimedia interface (HDMI) to name a few examples. Alternatively, as shown with the phantom line, the UI 116 may be connected to the central server 102 via the network 124. For example, the central server 102 may be a headless server in the cloud.

Local devices 114-0 through 114-n are shown. Using local device 114-0 as an example, it may include a memory 128, processor 130, a software application 132, and a UI 134. The UI 134 may receive messages sent from the social network application. The software application 132 is intended to represent an operating system (if required) and a module of the social network application that permits communications with the social network application 110 stored in memory 106. Since the local devices 114-0 through 114-n have the capability to interact as part of a social network of devices, they may be referred to as smart devices.

The central server 102 may access the social network application 110 to cross-reference the user profiles 112-0 through 112-n to a device characteristic. The central server can then send queries via the social network 110 to selected local devices matching the device characteristic, and receive responses to the queries via the social network from the selected local devices. In one aspect, the central server may send queries and receive response as a result of using a bulletin board, as explained in more detail below. In one aspect, the system 100 further comprises a database 136, stored in a central non-transitory memory (not necessarily memory 106), of queries and responses cross-referenced to the local devices.

In one aspect, the social network application 110 includes a bulletin board module 138. The bulletin board module may enable individual bulletin boards for each user account, bulletin boards for groups of user accounts, a public bulletin board, or all of these types. The bulletin board module 138 may receive unsolicited data from local devices 114-0 through 114-n for posting. The central server 102 may access the bulletin board module and add the unsolicited data to the database 136, or use the data to initiate queries or requests for functions to be performed.

In one aspect, the central server 102 sends instructions via the social network application 110, for functions to be performed by a local device with a user account in the social network application. Optionally, local device UI 134 presents a message in a natural human language, requesting user assistance in performing the functions. In another aspect, if local device 114-0 receives instructions via the social network application 110 for functions to be performed, and is unable to perform those functions, it sends the instructions via the social network application for local device 114-n to perform the functions. Alternatively, local device 114-0 may post the instruction on a bulletin board module 138 of the social network application, for review by the central server, or performance by a local device whose embedded software application is constructed to "voluntarily" perform posted instructions.

In a different aspect, UI 134 associated with local device 114-0 may accept a command, formatted in a natural human language, for functions to be performed. Local device 114-n may perform the functions if the local device 114-0 posts the instructions with the bulletin board module 138, and local device 114-n accesses the bulletin board module. Alternatively, local device 114-0 may access the social network database 136 of local devices cross-referenced to device characteristics, and determine that the local device 114-n is capable of performing the functions. Then, local device 114-0 sends instructions to local device 114-n via the social network application 110 for the functions to be performed. As another alternative, local device 114-0 posts the instructions with the bulletin board module 138, the central server 102 accesses the posted instruction and then accesses the database 136 of local devices cross-referenced to device characteristics. From this action, the central server 102 determines that local device 114-n is capable of performing the functions, and sends the instructions via the social network application 110 to local device 114-n.

The above-described social network controls and manages a network of smart devices. Natural human language (e.g. English) can be used to query device information. Natural human language can be used to instruct devices to perform specific actions, independently or in collaboration with human users. Smart devices in a social network can be made to behave indistinguishably from human participants, and smart devices can sign themselves up to a social network automatically like a human being To enable the system, a social networking platform hosted on a server is required. There are several closed-source and open-source products available for this purpose. Examples include: SocialEngine, elgg, Anahita, and BuddyPress. The specific product used is immaterial to the system as long as the chosen platform supports standard social networking features like: user accounts with permission settings, groups, posting to wall/group, reply to messages, newsfeed retrieval, and digital resource (documents, photos) retrieval.

Smart devices capable of executing custom applications or scripts are required, in order to participate as users in the social network. In one embodiment, the execution/scripting environment supports hypertext transport protocol (HTTP) client capability in order for the smart device to sign up, log in, retrieve messages, post messages, retrieve documents, submit documents, and log out of the social network. The smart device should also be able to programmatically invoke system services/functions through applications/scripts. This allows the smart device to carry out specific instructions or respond to queries for information about the device. The smart device connects to the social network through standard HTTP protocol, initiated by the application/script executing on the device. This is similar to how a user accesses the social network through a web browser or mobile application. This client-initiated, automatic polling mechanism allows the smart devices to be managed even when they are located behind a network firewall.

Human administrators manage the network of devices through the social networking platform. They access the social network through a web browser or equivalent application (e.g. mobile application), just as they would normally do on a public social network like Facebook™. They can view device status, query for detailed device information, give specific instructions to individual devices or groups of devices, or perform maintenance tasks (push software updates to devices, backup data from devices, etc.).

Figure 3:
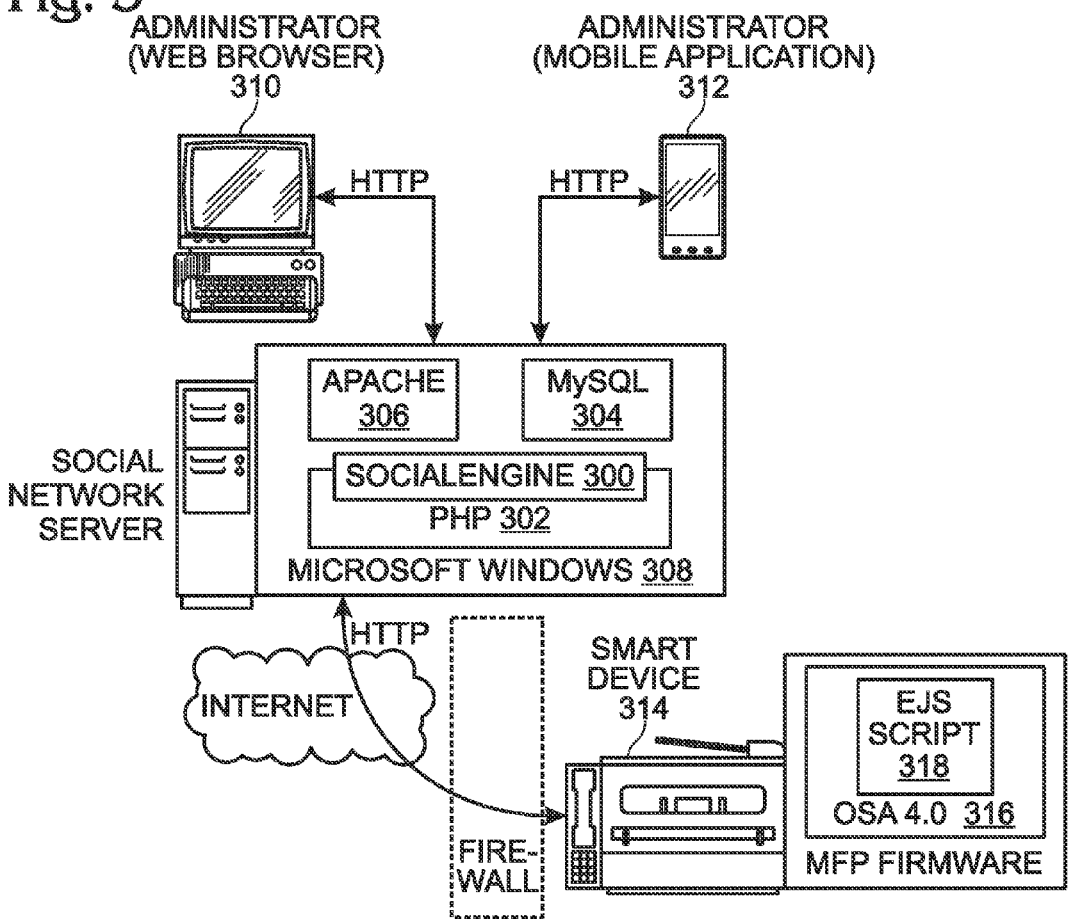
FIG. 3 is an exemplary MFP management system using the SocialEngine platform.

FIG. 3 is an exemplary MFP management system using the SocialEngine platform. SocialEngine 300 is a full-featured social networking system that runs on any web server that supports server-side scripting (PHP) 302 and My structured query language (MySQL) 304. In the prototype, a Microsoft Windows operating system 308 WAMP (Windows/Apache 306/MySQL/PHP) environment hosts SocialEngine 300. Administrator access to SocialEngine 300 can be supported through a regular web browser like Internet Explorer or Google Chrome 310 or a mobile application 312.

The smart device is an MFP 314 with Open Structure Architecture 316 (OSA) 4.0 support. OSA 4.0 is a web scripting environment that allows EJS (Embedded JavaScript) 318 scripts to be executed on the MFP 314. EJS scripts 318 were developed for the MFP 314 to automatically sign up, log in, and check their newsfeeds periodically for relevant messages on which they should act. When there are messages containing known key words (e.g. "click count", "your status") in the newsfeed, the EJS script 318 executes the desired operation (e.g. fetch click count information, get current status) and responds to the particular message with the operation result. The administrator who issued the request would then see the operation result through the message response. The administrator can either issue requests to an individual device or to a whole group of devices by sending private messages or group messages, respectively.

FIG. 4 is a flowchart illustrating a method for managing a social network of devices. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps and is associated with the descriptions of FIGS. 1-3. The method starts at Step 400.

Step 402 provides a non-transitory memory, a network interface, and a social network enabled as a software application with a sequence of processor instructions stored in the memory. In Step 404 at least two local devices, network-connected with the memory, create user accounts in the social network. In one aspect, the local devices automatically register (without human interaction). In response to creating the user accounts, in Step 406 each local device populates a user profile, listing device characteristics such as model, serial number, manufacturer, user-created name, location, owner, group memberships, status, functions, network address, and inventory of consumable resources to name a few examples. In Step 408 a central server accesses the user profiles in the social network. In Step 410 the central server cross-references user profiles to a first device characteristic.

In Step 412 the central server sends queries via the social network to selected local devices matching the first device characteristic. In one aspect, the UI of a first local device having a user account receives a message via the social network for presentation to a user. In Step 414 the central server receives responses to the queries via the social network from the selected local devices. In one aspect, the local devices automatically send responses to the queries, without human interaction with the devices. In Step 416 the central server maintains a database, stored in a central non-transitory memory, of queries and responses cross-referenced to the local devices.

In one aspect, Step 402 provides a social network bulletin board. In Step 411 the local devices automatically send unsolicited data via the social network for posting on the social network bulletin board. Optionally, maintaining the database in Step 416 includes the central server accessing the social network bulletin board and adding the unsolicited data to the database.

In another aspect, populating the user profile listing device characteristics in Step 406 includes the social network differentiating the local devices into a plurality of device groups based upon device characteristics. Then, the central server cross-referencing user profiles to the first device characteristic in Step 410 includes the central server cross-referencing the first device characteristic to a first device group.

In one aspect, in Step 418 the first local device receives instructions via the social network, for functions to be performed. Optionally, in Step 420, the first local device UI presents a message in a natural human language, requesting user assistance in performing the functions. If the first local device is unable to perform functions sent in the instructions, in Step 422 the first local device sends the instructions via the social network, for a second local device having a user account in the social network, to perform the functions. Alternatively, the first local device may post the instruction on a social network bulletin board for review by the central server or another local device able to perform the requested functions.

In another aspect, in Step 424 the UI associated with a first local device accepts a command, formatted in a natural human language, for functions to be performed. In Step 426 the second local device performs the functions in response to the first local device posting the task on the social network bulletin board, and the second local device accessing the social network bulletin board. Alternatively, the first local device accesses the social network database of local devices cross-referenced to device characteristics, determines that the second local device is capable of performing the functions, and sends instructions via the social network to second local device for the functions to be performed. As another alternative, the first local device posts the instructions on the social network bulletin board, and the central server accesses the posted instructions. The central server then accesses the database of local devices cross-referenced to device characteristics, determines that the second local device is capable of performing the functions, and sends the instructions via the social network to second local device.

A system and method have been provided for managing a system of devices using a social networking application. Examples of particular message structures, processors, and hardware units have been presented to illustrate the invention. However, the invention is not limited to merely these examples. Other variations and embodiments of the invention will occur to those skilled in the art.

We claim:

1. A method for managing a social network of devices, the method comprising:
providing a non-transitory memory, a network interface, and a social network with a bulletin board enabled as a software application with a sequence of processor instructions stored in the memory;
at least two local devices, network-connected with the memory, creating device user accounts in the social network;
in response to creating the device user accounts, each local device populating a device user profile listing device characteristics, where the device user profile is not associated with a human user profile;
a central server accessing the device user profiles in the social network;
the central server cross-referencing device user profiles to a first device characteristic;
the central server sending instructions to perform a device function via the social network to selected local devices matching the first device characteristic, where the instructions are sent without human interaction, and in a natural human language;
the central server receiving responses to the instructions in the natural human language via the social network from the selected local devices,
a user interface (UI), associated with a first local device and a human user account, accepting a command, formatted in the natural human language, for functions to be performed; and,
a second local device having a device user account performing the functions in response to a scenario selected from a group consisting of:
the first local device posting the task on the social network bulletin board in the natural human language, and the second local device accessing the social network bulletin board;
the first local device accessing a social network database of local devices cross-referenced to device characteristics, determining that the second local device is capable of performing the functions, and sending instructions in the natural human language via the social network to second local device for the functions to be performed; or,
the first local device posting the instructions on the social network bulletin board in the natural human language, the central server accessing the posted instructions and then accessing the social network database of local devices cross-referenced to device characteristics, determining that the second local device is capable of performing the functions, and sending the instructions via the social network to second local device.

2. A social network device management system comprising:

a central server comprising:
   a processor;
   a non-transitory memory;
   a network interface;
   a social network with a bulletin board module, enabled as a software application with a sequence of processor instructions stored in the memory, with at least two device user accounts associated with local devices that are network-connected, where each device user account includes a device user profile listing device characteristics, and where the device user account is not associated with a human user account;
wherein the central server accesses the device user profiles in the social network, cross-references the device user profiles to a first device characteristic, sends instructions to perform a machine function, without human intervention, in a natural human language via the social network to selected local devices matching the first device characteristic, and receives responses to the instructions in the natural human language via the social network from the selected local devices;
the system further comprising:

a user interface (UI), associated with a first local device and a human user account, accepting a command formatted in a natural human language, for functions to be performed; and, a second local device having a device user account performing the functions in response to a scenario selected from a group consisting of:
   the first local device posting the instructions in the natural human language with the bulletin board module, and the second local device accessing the bulletin board module;
   the first local device accessing a social network database of local devices cross-referenced to device characteristics, determining that the second local device is capable of performing the functions, and sending instructions in the natural human language to second local device via the social network application for the functions to be performed; or,
   the first local device posting the instructions in the natural human language with the bulletin board module, the central server accessing the posted instruction and then accessing the database of local devices cross-referenced to device characteristics, determining that the second local device is capable of performing the functions, and sending the instructions via the social network application to second local device.

* * * * *